Aug. 18, 1936.     A. P. BALL     2,051,673
TRIM PANEL ASSEMBLY
Filed March 24, 1936     2 Sheets-Sheet 1
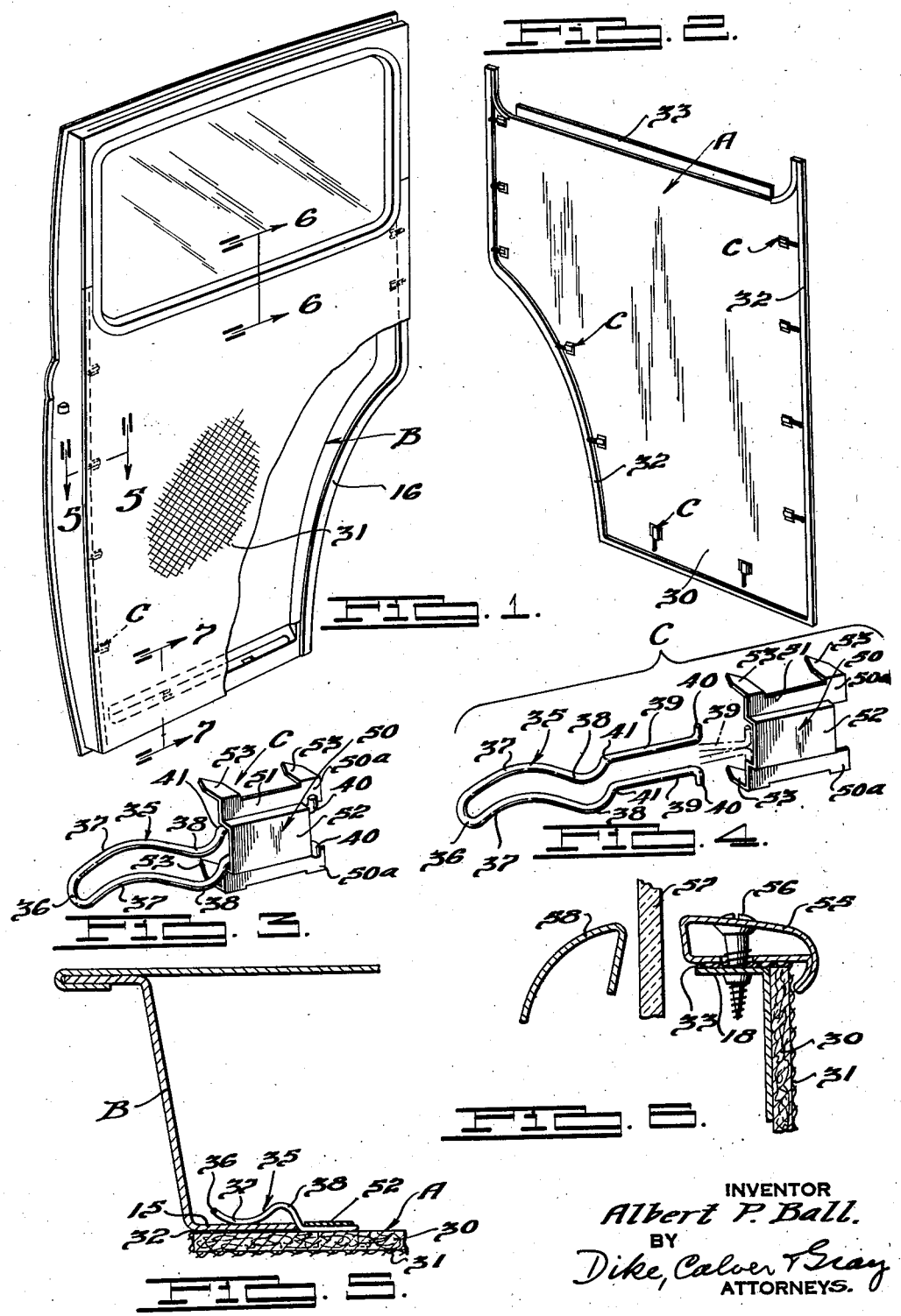
INVENTOR
*Albert P. Ball.*
BY
*Dike, Calver & Gray*
ATTORNEYS.

Aug. 18, 1936.                A. P. BALL                    2,051,673
                         TRIM PANEL ASSEMBLY
                       Filed March 24, 1936         2 Sheets-Sheet 2
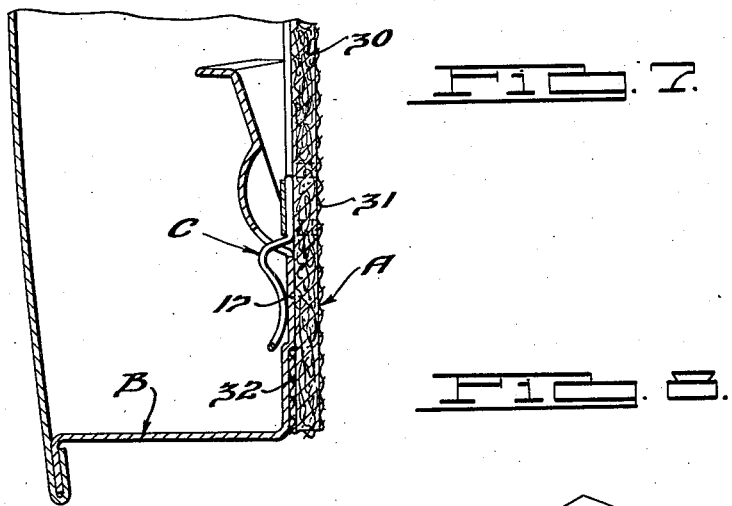
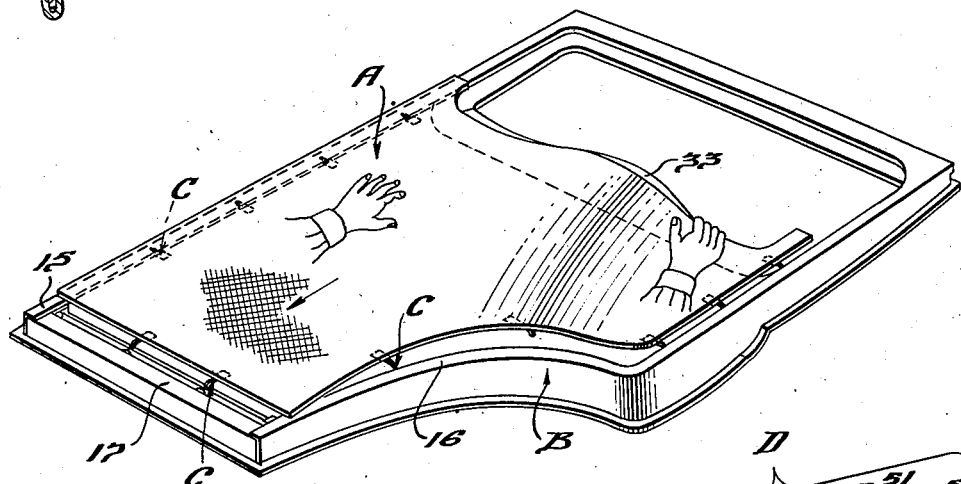
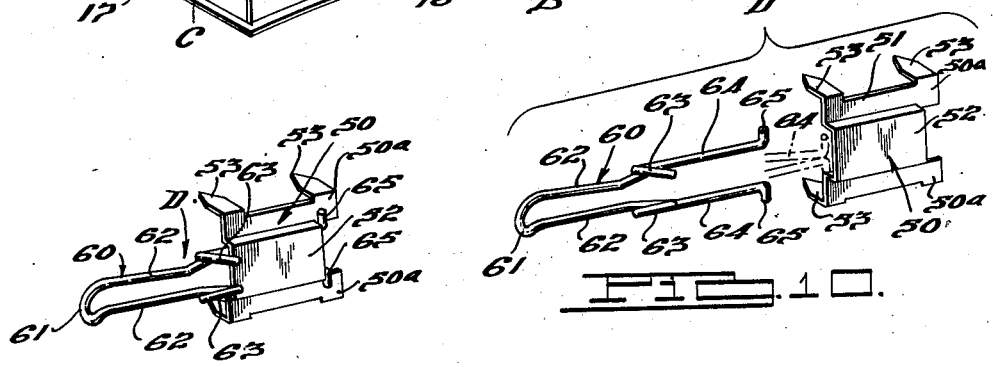
INVENTOR
Albert P. Ball.
BY
Dike, Calvert & Gray
ATTORNEYS.

Patented Aug. 18, 1936

2,051,673

UNITED STATES PATENT OFFICE 2,051,673

TRIM PANEL ASSEMBLY

Albert P. Ball, Detroit, Mich., assignor to Briggs Manufacturing Company, Detroit, Mich., a corporation of Michigan Application March 24, 1936, Serial No. 70,620

9 Claims. (Cl. 24—261)

This invention relates to trim panels or trim panel assemblies particularly adapted for use in the interior trim finish of automobiles or other vehicle bodies, and especially to the fastener devices and retainer members for trim panels.

An object of the invention is to provide a new and improved interior trim panel, or trim panel assembly, and an improved method of forming, constructing and applying the trim portions of the body.

Another object of the invention is to provide a trim panel with improved fastener means for removably attaching the panel to a supporting surface with ease and facility.

Another object of the invention is to provide a trim panel with improved detachable fastener devices formed of spring wire.

Other objects and advantages of this invention will appear from the following description and appended claims when taken in conjunction with the accompanying drawings forming a part of this specification.

In said drawings:

Fig. 1 is a perspective view looking toward the inside of a vehicle rear door carrying a trim panel embodying the present invention.

Fig. 2 is a perspective view looking at the inner face of the detached trim panel of Fig. 1.

Fig. 3 is a perspective view, on an enlarged scale, of one form of fastener device and retainer member, shown in assembled relation.

Fig. 4 is a view similar to Fig. 3 but showing the parts in disassembled relation, and illustrating one method of assembling the fastener element with its retainer.

Fig. 5 is an enlarged detail horizontal section taken substantially along the line 5—5 of Fig. 1.

Fig. 6 is a detail vertical section, on an enlarged scale, taken substantially along the line 6—6 of Fig. 1.

Fig. 7 is a detail vertical section, on an enlarged scale, taken substantially along the line 7—7 of Fig. 1.

Fig. 8 is a perspective view of the vehicle front door of Fig. 1, illustrating one mode of assembly therewith of the trim panel shown in Fig. 2.

Fig. 9 is a perspective view, on an enlarged scale, showing a modified form of fastener device and retainer member embodying the invention, with the parts in assembled relation; and Fig. 10 is a view similar to Fig. 9, with the fastener element and retainer member shown in disassembled relation, and illustrating one method of assembling the fastener with the retainer.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to Figs. 1 to 8 inclusive of the drawings, there is illustrated therein, by way of example, a fabric covered trim panel A adapted to be releasably attached to a support such, for example, as the inner side or face of an automobile rear door B. In the present instance, the panel comprises a relatively stiff preferably non-metallic backing or foundation sheet 30 of suitable material, such as fiber-board. The outer face of the sheet is preferably covered with a suitable fabric or other trim material 31 which is folded around the side and bottom edges of the backing or foundation sheet, as shown at 32, and preferably cemented thereto, see Figs. 2, 5 and 7. The upper edge 33 of the trim fabric is left free so that it can be folded over the upper edge of the foundation sheet when the trim panel is assembled with the door or other supporting surface, as best shown in Fig. 6.

In the present form of the invention, the inner or rear face of the foundation sheet has applied thereto, adjacent its side and bottom edges, a series or plurality of combined fastener elements and retainer members C, one such being shown in detail in Figs. 3 and 4. The fastener element, as a whole, is shown at 35 and comprises a length of relatively stiff wire bent into generally U-shape to provide longitudinally extending parallel sides. As illustrated it comprises a looped outer end or lead portion 36, inwardly and downwardly curved or arched sections or portions 37 and reversely curved or arched sections or portions 38. The sections 36, 37 and 38 provide the yieldable gripping portion of the fastener 35. The sections 38 are extended to substantially provide straight portions or legs 39 having their inner or free ends bent outwardly to provide lugs or anchoring members 40. These lugs or anchoring members engage one edge of a channel or socket of a retainer member shown as a whole at 50, and the inner ends 41 of the curved sections 38 where they merge into the legs 39 provide stops or abutments which engage the opposite edge of the retainer member channel when the fastener and retainer are assembled, see particularly Fig. 3, to releasably lock the fastener element and retainer together. The bowed portion 38 of the fastener provides a relatively stiff intermediate spring portion yieldable to enable the end of the fastener to be sprung outwardly from engagement with the inner face of the foundation sheet 30 and effective to impart the desired tension to the gripping end of the device. To facilitate attachment of the panel to its support and to permit easy engagement of the fastener with said support the forward end of each of the fasteners 36 is flared outwardly, as best seen in Fig. 5.

The retainer member 50 is preferably formed of sheet metal stamped out of a single piece of material to provide a retainer or staple-like member which serves to secure the fastener element 35 in position upon the inner face of the foundation sheet 30. As shown, the retainer member 50 has a body portion 51 provided with an outwardly offset socket portion 52 to receive the legs 39 of the fastener element, and with spurs or prongs 53, four such being shown, merely by way of example. The prongs 53 are capable of piercing and being forced through the material of the foundation sheet 30 and their ends clinched over (see Fig. 5). It will be seen that the body portion 51 of the retainer is cut away so that the socket 52 does not extend the full length of the retainer body but terminates short of its inner edge, as clearly shown in Figs. 3 and 4. Thus the offset ends or anchoring members 40 of the fastener seat or rest upon the base or body portions 50a of the retainer and are thus maintained out of contact with the backing sheet 30. After the retainer has been applied to the foundation sheet, the fastener element is assembled therewith by pressing the legs 39 together and passing or forcing the legs endwise through the channel or socket portion 52 of the retainer. When the lugs 40 clear the end of the channel they will snap outwardly into interlocking position under tension, as shown in Fig. 3. It will be seen that a series of the combined fastener members and retainers are positioned adjacent the upright side edges and the bottom edge on the rear or inner face of the foundation sheet, and that the free ends or leads of the fasteners extend in the direction of their respective foundation sheet edges.

With the parts assembled as above described, the foundation sheet is applied to its support in a manner such as illustrated in Fig. 8. In accordance with the method of assembly shown in this figure, the looped ends or lead portions 36 of the fasteners are inserted beneath the flange 15 of the door or support B and the entire sheet moved to the left until the fastener elements engage the flange, as shown in Figs. 4 and 8. The trim panel is now bowed or flexed by hand in the manner illustrated (Fig. 8) so that the guide or lead portions of the fastener elements at the opposite edge of the sheet or panel can be inserted under the flange of the door frame at that edge of the door. The panel is then flattened out by applying pressure thereto, this serving to force the fastener elements under the flange 16. The entire panel A is now moved or slid downwardly toward the bottom edge of the door so that the guide portions or free ends 36 of the lower set of fastener members engage beneath the bottom flange 17 of the door, as seen in Fig. 7. Due to the stiffness of the spring wire fasteners the side and bottom edges of the trim panel A will be drawn into intimate engagement with the door flanges. The fact that the portions or sections 37 and 38 of the fastener are reversely curved or sinuous, as best shown in Fig. 5, provides the fastener with sufficient resiliency to permit it to flex upon hooking it under the flange while affording the desired gripping engagement with the flange. The free edge 33 of the trim fabric is now folded over the top edge of the foundation sheet 30 and laid over the central horizontal flange 18 of the door, see Fig. 6. In this figure a fragment of the door well and associated parts are shown. The folded over portion of the trim fabric is held in position against the flange 18 by a garnish molding 55 removably mounted upon the flange by means of screws 56. In this manner the portion 33 of the trim fabric is gripped in position and held tightly against the flange. The window glass is shown at 57 and, as usual, is capable of being raised and lowered into the window well located between the flange 18 and the outer reveal 58.

Referring now to Figs. 9 and 10, there is shown in these figures a modified form of fastener element embodying the present invention which is assembled with a retainer member 50 corresponding to that of the preceding views. The fastener element and retainer member of the present form are shown as a whole at D, the fastener per se being shown at 60. As in the preceding form, the fastener has a U-shaped outwardly flared guide or lead portion 61 and a body portion comprising upwardly inclined sections or portions 62 which are bent to provide spring coils 63, and inwardly extending straight and substantially parallel leg portions 64 which terminate in laterally offset or bent inner free ends providing anchoring members 65. The sections or members 61, 62 and 63 provide the gripping or free end portion of the fastener element 60. The fastener 60 functions in the same manner as the fastener 35 of the preceding views, the coils 63 providing additional stiffness and springiness to the fastener. The fastener 60 is assembled with the previously applied retainer 50 by compressing the legs 64 (see broken lines, Fig. 10) and then passing or forcing the legs endwise through the channel or socket portion 52 of the retainer. After the lugs 65 clear the end of the channel, expansion of the legs due to the tension thereof holds the parts firmly interlocked. When the parts are assembled (Fig. 9) the anchoring members or lugs 65 engage the inner edge of the socket portion of the retainer and rest upon the portions 50a of the retainer body. The coils 63 engage the outer or opposite edge of said channel or socket 52 to releasably lock the fastener in position.

I claim:

1. A fastener device for a trim panel comprising a length of wire bent into substantially U-shape having an arcuate terminal gripping portion and a pair of substantially parallel leg members, and a retainer for releasably securing the device to the panel to extend in a direction substantially parallel to the face of the panel.

2. A fastener device for a trim panel comprising a length of wire bent into substantially U-shape having an arcuate terminal gripping portion and a pair of substantially parallel leg members terminating in oppositely bent ends, and a retainer for releasably securing the device to the panel to extend in a direction substantially parallel to the face of the panel and having portions interlocked with said ends.

3. A fastener device for a trim panel comprising a spring metal strip bent into substantially U-shape, the forward end thereof being upwardly curved from the general plane of the device, the intermediate portion thereof being bowed, and the opposite end comprising compressible leg members terminating in offset ends.

4. A fastener device for a trim panel comprising a spring metal strip bent into substantially U-shape, the forward end thereof being upwardly curved from the general plane of the device, the intermediate portion being formed with a spring coil portion, and the opposite end comprising compressible leg members terminating in offset ends.

5. A fastener device for a trim panel comprising a retainer member having an offset portion providing a socket, means carried by said retainer for attaching it to said panel, and a fastener element formed from a single piece of wire removably supported by said retainer member to extend in a direction substantially parallel to the face of the panel, said wire being shaped to provide leg portions interlocked within said socket and a sinuous gripping portion located outside the socket.

6. A fastener device for a trim panel comprising a metal retainer plate having a body portion provided with an offset channel and means for attaching it to the trim panel, and a fastener element formed from a single piece of wire bent into substantially U-shape and having legs extending normally in substantial parallelism, said legs having straight portions releasably engageable with said offset channel, means at opposite ends of said straight portions for engaging the ends of said channel, and a gripping portion normally engaging the trim panel when the parts are in assembled relation, said gripping portion being reversely bent and having an end flared outwardly from the trim panel.

7. A fastener device for a trim panel comprising a metal retainer plate having a body portion provided with an offset channel and means for attaching it to the trim panel, and a fastener element formed from a single piece of wire bent into substantially U-shape and having legs extending normally in substantial parallelism, said legs having straight portions releasably interlocked in said channel, means at opposite ends of said straight portions for engaging the ends of said channel, said legs terminating in a gripping portion located exteriorly of said channel and having coils formed therein.

8. A fastener device for a trim panel comprising a metal retainer plate having a body portion provided with an offset channel and means for attaching it to the trim panel, and a fastener element formed from a single piece of wire bent into substantially U-shape and having legs extending normally in substantial parallelism, said legs having straight portions releasably interlocked in said channel, means at opposite ends of said straight portions for engaging the ends of said channel, said legs terminating in a gripping portion located exteriorly of said channel and having a spring bow formed therein.

9. A fastener device for a trim panel comprising a spring metal strip bent into substantially U-shape with the sides thereof extending in the general direction of the plane of the panel when the fastener is secured thereto, the forward end of the device being upwardly curved from the general plane of the device, an intermediate portion thereof being bowed to provide a spring gripping portion, and the opposite end comprising compressible leg members attachable to the panel.

ALBERT P. BALL.